United States Patent
Erramilli et al.

(10) Patent No.: US 12,554,999 B2
(45) Date of Patent: Feb. 17, 2026

(54) INLINE VALIDATION OF MACHINE LEARNING MODELS

(71) Applicant: Salesforce, Inc., San Francisco, CA (US)

(72) Inventors: Vijay Erramilli, San Mateo, CA (US); Regunathan Radhakrishnan, Dublin, CA (US); Prashant Agrawal, Kirkland, WA (US)

(73) Assignee: Salesforce, Inc., San Francisco, CA (US)

( * ) Notice: Subject to any disclaimer, the term of this patent is extended or adjusted under 35 U.S.C. 154(b) by 1038 days.

(21) Appl. No.: 17/502,536

(22) Filed: Oct. 15, 2021

(65) Prior Publication Data

US 2023/0118341 A1    Apr. 20, 2023

(51) Int. Cl.
*G06N 5/022*  (2023.01)
*G06F 16/28*  (2019.01)
*G06N 5/04*   (2023.01)

(52) U.S. Cl.
CPC .......... *G06N 5/022* (2013.01); *G06F 16/285* (2019.01); *G06N 5/04* (2013.01)

(58) Field of Classification Search
CPC ............ G06N 5/022; G06N 5/04; G06N 3/08; G06N 3/0455; G06N 20/00; G06F 16/285
See application file for complete search history.

(56) References Cited

U.S. PATENT DOCUMENTS

| | | | | |
|---|---|---|---|---|
| 11,509,674 | B1* | 11/2022 | Beauchesne | H04L 63/1425 |
| 2021/0397972 | A1* | 12/2021 | Walters | G06N 3/047 |
| 2022/0311795 | A1* | 9/2022 | Hutelmyer | H04L 63/1433 |
| 2023/0368070 | A1* | 11/2023 | Bhargava | G16H 50/20 |

OTHER PUBLICATIONS

Li, H., Xiong, L., Jiang, X. (2015). "Differentially Private Histogram and Synthetic Data Publication." In: Gkoulalas-Divanis, A., Loukides, G. (eds) Medical Data Privacy Handbook. Springer, Cham., pp. 35-38. (Year: 2015).*

(Continued)

*Primary Examiner* — Cesar B Paula
*Assistant Examiner* — Maxwell August Ludwikowski
(74) *Attorney, Agent, or Firm* — Holland & Hart, LLP

(57) ABSTRACT

Methods, apparatuses, and computer readable media are disclosed. An application server may receive a dataset that includes records associated with user device interactions with a computer system. The application server may modify one or more records according to a data modification metric. The modifying may result in a modified dataset that satisfies a similarity metric defining a permissible deviation between the received dataset and the modified dataset according to a deviation threshold. The data modification metric may satisfy the similarity metric and may define a deviation in the modified dataset that results in an expected classification by the machine learning predictive model to classify the deviation in the modified dataset as an outlier event. The application server may process the modified dataset with the machine learning predictive model to produce a result. The application server may compare the expected classification to the classification to validate the model.

20 Claims, 12 Drawing Sheets

(56) References Cited

OTHER PUBLICATIONS

Yang, Y.; Zheng, K.; Wu, C.; Yang, Y. (2019). "Improving the Classification Effectiveness of Intrusion Detection by Using Improved Conditional Variational Auto Encoder and Deep Neural Network." In: Sensors 2019, 19, 2528. (Year: 2019).*

Dwork, C., McSherry, F., Nissim, K., Smith, A. (2006). "Calibrating Noise to Sensitivity in Private Data Analysis." In: Halevi, S., Rabin, T. (eds) Theory of Cryptography. TCC 2006. Lecture Notes in Computer Science, vol. 3876. Springer, Berlin, Heidelberg. pp. 265-284. (Year: 2006).*

Gulrajani, Ishaan, et al. "Improved training of wasserstein gans." Advances in neural information processing systems 30 (2017). (Year: 2017).*

* cited by examiner

INLINE VALIDATION OF MACHINE LEARNING MODELS

FIELD OF TECHNOLOGY

The present disclosure relates generally to database systems and data processing, and more specifically to inline validation of machine learning models.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

A cloud platform may employ the use of machine learning models for various data processing tasks including making predictions and detecting anomalies. However, techniques for validating the accuracy or performance of such machine learning models may be deficient.

DETAILED DESCRIPTION

Figure 1:
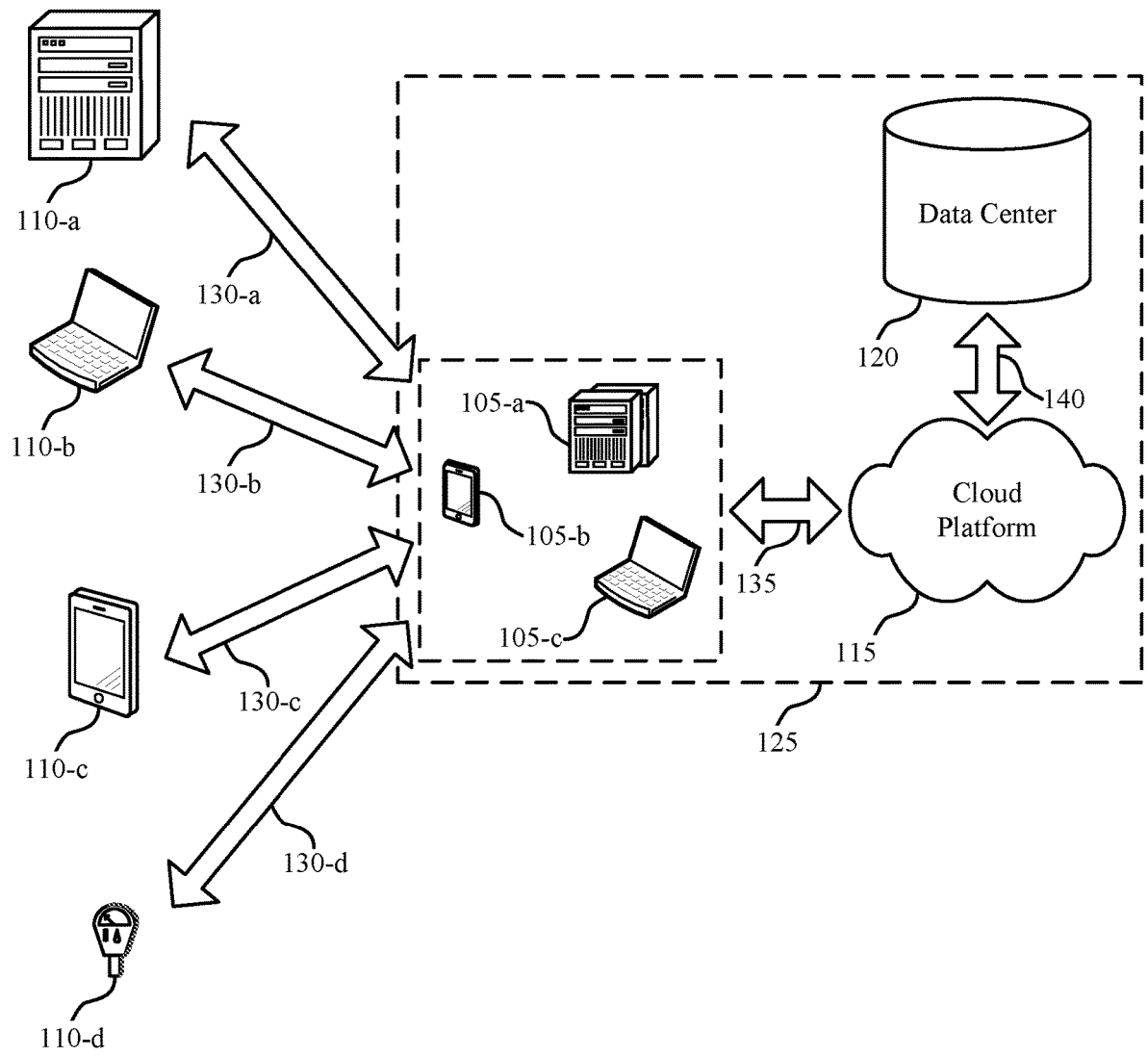
FIG. 1 illustrates an example of a validating a machine learning predictive model for classifying outlier events system that supports inline validation of machine learning models in accordance with aspects of the present disclosure.

Machine learning models may be used in various contexts, including the security context. In particular, machine learning models may be used to analyze data and detect anomalies that may indicate a security event has occurred. For example, an organization may collect and store information about users and activities performed by those users while using a computer network (e.g., acting as a client of an application server in a software-as-a-service context). A machine learning model may be used to gather, organize, and analyze the data to detect or determine whether a security event (e.g., unauthorized access to information or a computing resource) has occurred. However, validation of such models that are used in a security context is difficult, since actual security events are relatively rare and are often not logged or recorded. As such, the efficacy of such a model is measured based on these rare past events, and continuous validation of such models is similarly difficult for the same reasons. Some approaches emulate security events (e.g., similar to penetration testing), but these approaches do not scale well and do not easily allow for testing of different security scenarios. Additional approaches involve synthetic generation of test data, but such synthetic data do not contain the idiosyncrasies of real-world data and the real world itself, decreasing the usefulness of such validation approaches.

To improve validation of security-focused machine learning models, a validation step may be incorporated into a machine learning model pipeline to continuously validate the models. Such a validation step may be included in or associated with a scoring step in a machine learning model pipeline. In the validation step, production (e.g., real-world) data may be modified with additional data points to satisfy one or more constraints (e.g., adding in a specific outlier or inlier into the data set that may be associated with or indicate a security event, for example). Some examples of validation may include the use of similarity metrics to measure the similarity between the original, real-world data and the modified data. Further, the validation may include approaches to modifying the data that may be constrained by or satisfy the similarity metrics. In this way, the efficacy of machine learning models may be evaluated or validated in a continuous, useful way, since the approaches maintain both the modifications that simulate a security event as well as the real-world artifacts and idiosyncrasies that were present in the data before modification. This provides more training with "triggers" that a model should be designed to detect, and also allows for better real-world applicability since actual data is being used in the validation process.

In some cases, such machine learning validation systems may modify particular types of data, such as categorical data, numerical data, or both. Since categorical data and numerical data represent different types of data by definition, different approaches may be used for the modification of such data. For example, different similarity metrics and data modification metrics may be employed based on a data type (e.g., categorical data, numerical data, or other types of data may be considered). In a further example, the use of categorical features may be used or selected in connection with categorical values, and additional processing particular to categorical features or values may be employed. Further still, numerical values may be added to a dataset to produce conditions in the dataset to be used by the machine learning model validation approaches. Additionally or alternatively, validation of such machine learning models may be repeated, or may be performed continuously. For example, a system implementing one or more approaches described herein may receive updated or additional data, and the system may reprocess or remodify an updated dataset, and the machine learning model may be revalidated.

Aspects of the disclosure are initially described in the context of an environment supporting an on-demand database service. Aspects of the disclosure are then illustrated by a system, validation schemes, and a process flow. Aspects of the disclosure are further illustrated by and described with reference to apparatus diagrams, system diagrams, and flowcharts that relate to inline validation of machine learning models.

FIG. 1 illustrates an example of a system 100 for cloud computing that supports inline validation of machine learning models in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-a), a smartphone (e.g., cloud client 105-b), or a laptop (e.g., cloud client 105-c). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-a, 130-b, 130-c, and 130-d). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-a), a laptop (e.g., contact 110-b), a smartphone (e.g., contact 110-c), or a sensor (e.g., contact 110-d). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

In some examples, the clients 105 may communicate with the cloud platform 115, and the cloud platform 115 may provide functions or operations associated with validation of machine learning models (e.g., models running on or associated with the cloud platform 115 or running on other systems). The data center 120 may receive, store, or transmit datasets including records that may be used for machine learning model validation as described here. The cloud platform 115 may modify records of the dataset in accordance with approaches described herein. For example, the cloud platform 115 may modify records in accordance with or based on a data modification metric that satisfies a similarity metric, so that the modifications in the data stay within parameters defined for the machine learning validation approach (e.g., the data may be similar enough to the received real world data, but may also be sufficient for validation of events, such as security events, that a machine learning model under validation may detect or analyze). The cloud platform 115 may also process the modified dataset with the machine learning model to produce a result (e.g., a result identifying or processing one or more security events) and the machine learning model may be validated by comparing the result to an expected result.

In some machine learning contexts, validation is relatively easy. For example, in a well known machine learning model in production in a different domain (e.g., recommendation of movies), it would relatively easy to verify and measure the efficacy of such a model as plenty of past data is available (e.g., ratings of movies by individual users to test on). Further, it may be relatively easy to measure the efficacy of such a model continuously in production (e.g., a measurement of whether movies recommended to users are being seen or not). However, some approaches to machine learning model validation in other contexts (e.g., information technology security) may be insufficient, as such approaches may use a small number of real world events or information, and validation may be difficult or impossible using such a small number of events. For example, if a model is built to detect a sophisticated attacker breaching a computer system, moving to different parts of the system, and then exfiltrating some sensitive data, the efficacy of such a model may currently be measured if past such events have happened in the past or are logged or recorded. Further, to continuously validate such a model in production into the future, such events need to happen on a regular basis, which may be very rare (e.g., as attackers may be very sophisticated to breach defenses).

Some approaches to such validation situations exist but are deficient. One approach includes "emulating" an attack scenario and verifying if the model detects the scenario or not. However, such emulation is difficult to scale and does not allow for testing all possible situations easily. Further, continuous validation of a model with this approach may not be done continuously. Another approach involves generation of synthetic data to test the model against. While these tests may be performed more frequently, and the synthetic data is useful to test the model in a 'controlled' setting, such synthetic data does not contain different idiosyncrasies of real-world data and the real world itself, decreasing the utility of measuring efficacy of the models via this approach.

The approaches discussed herein include creation or modification of real-world data to increase or improve its effectiveness for validation of machine learning models (e.g., machine learning models associated with an information technology security context). As used herein, "real-world" data may be data that is naturally generated by and collected from interactions between people, user devices, computer systems, businesses, and other entities. An example system may receive real-world data and modify or augment such data in accordance with metrics that both include additional triggers, situations, or other information that may be useful for validating the models (e.g., information that may represent or indicate a security event) while maintaining the real-world characteristics of the originally received data. In this way, the approaches described herein offer both more effective and more easily produced validation of machine learning models.

For example, a user may implement, train, or create a machine learning model for the detection, analysis, or other processing associated with information technology security or in another context. Such a user may access, use, communicate with, or otherwise employ a system, server, or device that implements the approaches described herein. Such a system may receive data (e.g., real-world data related to the user's use case or situation or provided by the user herself), and may modify such data in accordance with or based on one or more metrics (e.g., a similarity metric, a data modification metric, other metrics, or any combination thereof) so that the received data becomes more useful for validation (e.g., the modified data may include more characteristics or indications that a machine learning model is trained to identify, report, or process) while still maintaining the real-world characteristics that may be likely to be present in an actual, real-world detection or processing scenario once the machine learning model is deployed or implemented. Such data may then be processed by the system to produce a result or output generated by the machine learning model. Such a result may then be compared to an expected result (e.g., provided by the user, the system, or another source) to validate the model (e.g., to see whether the model accurately detected, identified, or otherwise processed both the inserted characteristics or features as well as the naturally-present real-world information inherent in the initially received data).

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
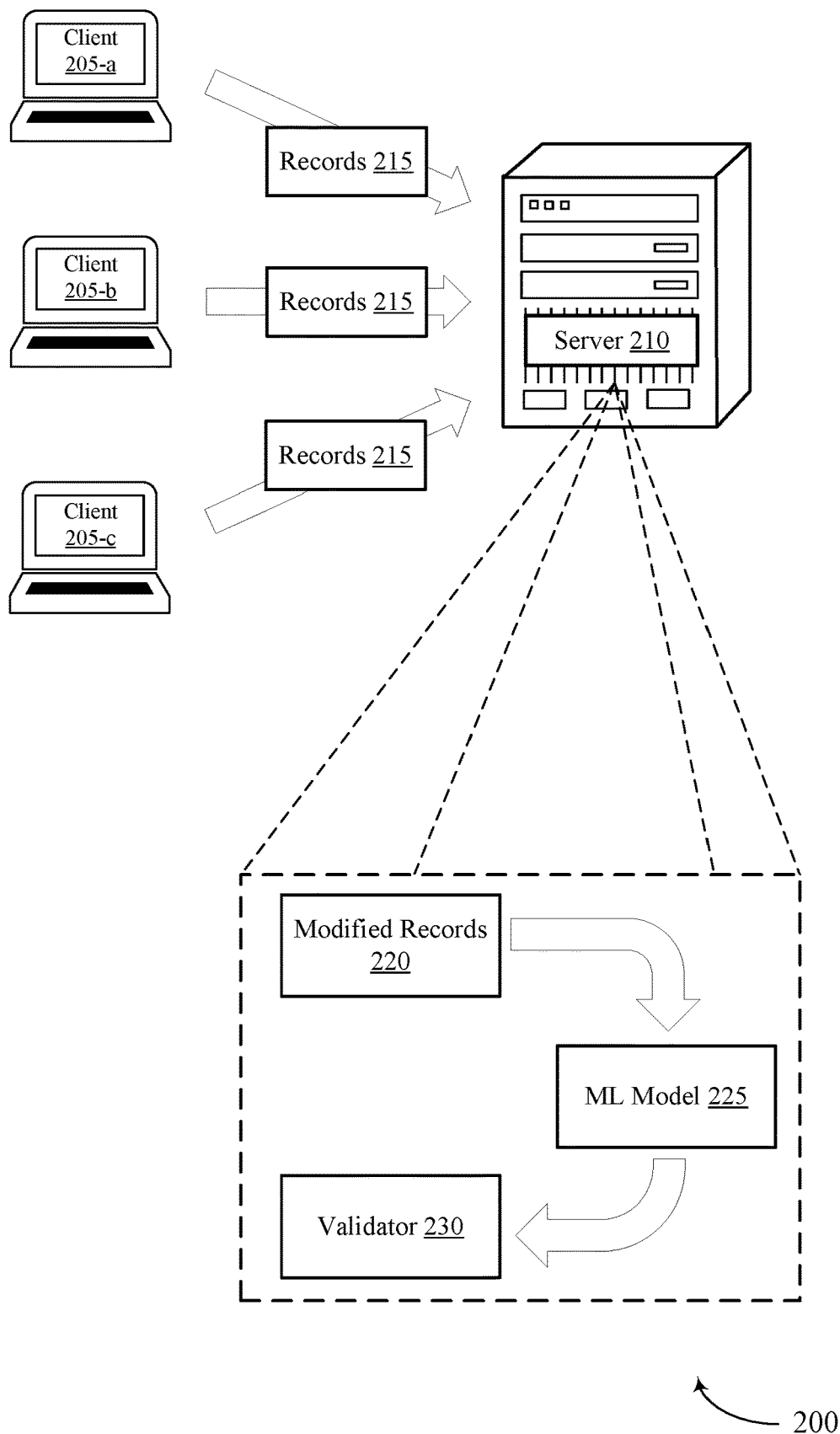
FIG. 2 illustrates an example of a system that supports inline validation of machine learning models in accordance with aspects of the present disclosure.

FIG. 2 illustrates an example of a system 200 that supports inline validation of machine learning models in accordance with aspects of the present disclosure. The system may include clients 205 and a server 210. The clients may interact with the server 210, and the server 210 may provide functions, operations, information, or other interactions associated with the approaches described herein.

In some examples, the clients 205 may transmit records 215 to the server. Additionally or alternatively, the records 215 may be stored in a location associated with the server 210 or may be stored elsewhere. The records 215 may form a dataset that may be processed by the server according to the approaches described herein. Such records 215 or dataset may include information about or may be associated with one or more interactions of one or more user devices with a computer system. For example, the records 215 may be generated by one or more interactions of the clients 205 with the server 210 or another computer system. Additionally or alternatively, the records 215 may have been generated by interactions of other devices with the server 210. Additionally or alternatively, the records 215 may have been generated by or associated with one or more other clients and one or more other computer systems. The records 215 may be examples of real-world data that is collected from clients 205. Examples of real-world data include but are not limited to browsing history (e.g., websites visited, the IP address from which a website is accesses, the geographic location from which an IP address originates, the time of day a website is accesses, the frequency with which a website is accessed, a number of password entries or login attempts etc.), purchase history (e.g., the geographic location of a purchase, the time of day of a purchase, the business name, location, or type, the frequency of purchases, the amount purchased, etc.), and the like.

The server 210 may create the modified records 220 by modifying or augmenting the received records 215 according to one or more metrics. For example, the server 210 may employ one or more data modification metrics, one or more similarity metrics, or both. The similarity metric may define a permissible deviation between the records 215 or dataset and the modified records 220 or modified dataset. Such a similarity metric may be associated with a deviation threshold, which may be used to define the permissible deviation. The data modification metric may satisfy the deviation metric (e.g., the data modification metric may define a modification to one or more records 215 or the dataset to form the modified records 220) and may define a deviation (e.g., an actual deviation created as a result of the modification) in the modified records 220. Such a deviation may, upon processing by the machine learning model, cause the ML model 225 to classify the deviation as an outlier event or otherwise trigger a recognition or classification by the ML model 225.

The modified metrics may be processed by the ML model 225 to produce a result, and the result may be processed by the validator 230 to validate the ML model 225, such as by comparing the result to an expected result. If, for example, the result and the expected result share one or more characteristics or information, the validation may be successful. Additionally or alternatively, the result and the expected result may each include a classification. For example, the result may be a classification result produced by the validator 230, and the expected result may be an expected classification result (e.g., if the validation is successful, it would be expected that the actual result would resemble, be similar to, or be the same as the expected classification result).

Figure 3:
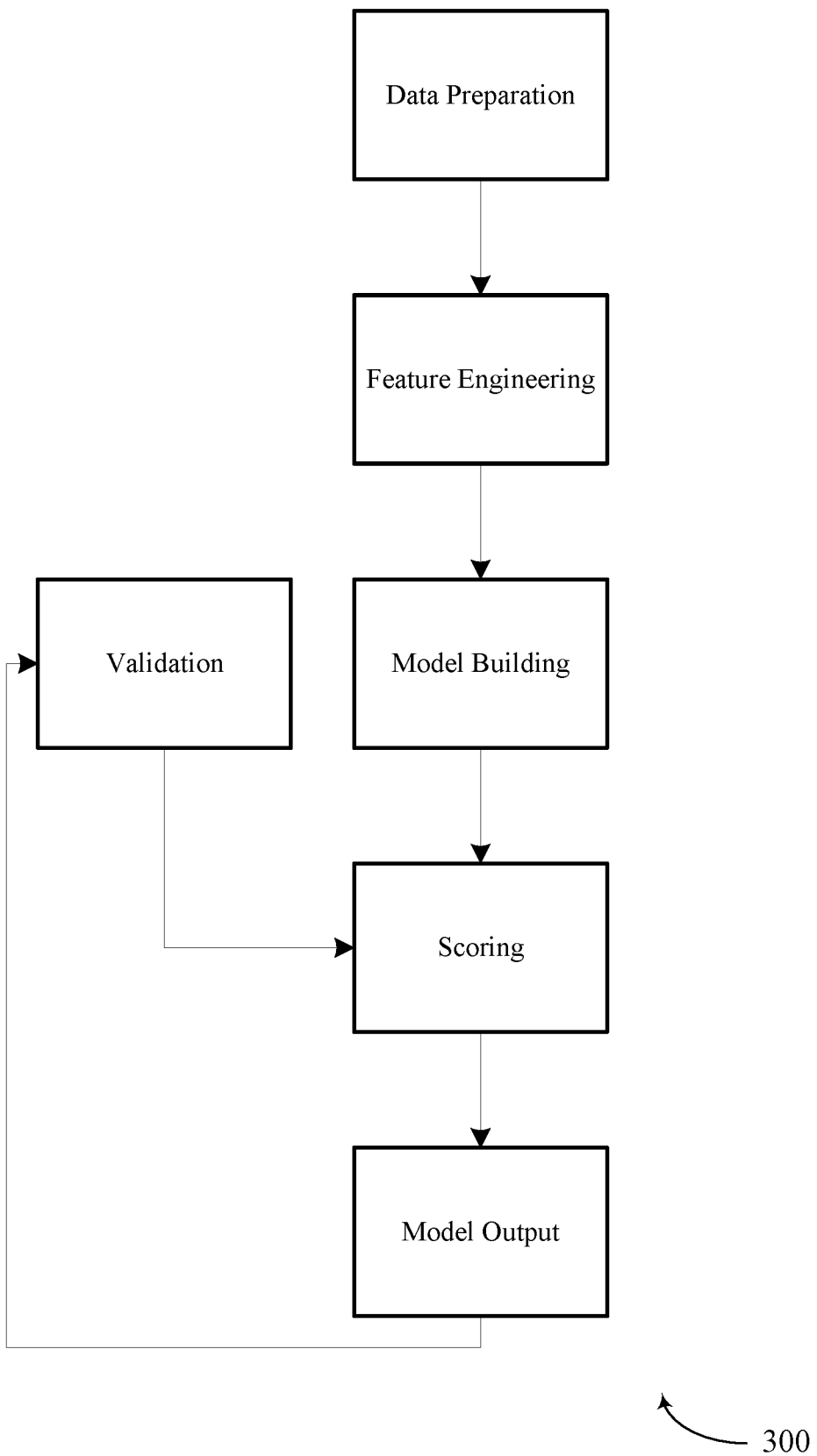
FIG. 3 illustrates an example of a validation scheme that supports inline validation of machine learning models in accordance with aspects of the present disclosure.

FIG. 3 illustrates an example of a validation scheme 300 that supports inline validation of machine learning models in accordance with aspects of the present disclosure. In such a process, a user or system for producing a ML model may start with data preparation or cleaning. Such preparation or cleaning may involve modification, formatting, or other processing of data to make the data more appropriate for use in the ML model production process. The pipeline may include a feature engineering step, in which one or more features of the ML model may be designed or implemented, and such features may be used to build the actual ML model of which may feed into building the model. Once the model is built, the model may be used to perform scoring or inference. In some examples, the scoring or inference may utilize new data (e.g., data that is different from the prepared data used earlier) in the scoring step. Once the data is scored in the scoring or inference step, the scored data may be received and processed in a model output step where the output may be changed or modified for suitable presentation.

The various approaches described herein may include modification of such a sequence to include a 'validation' module/step that feeds into the scoring step, as shown in FIG. 3. In some examples, the validation step may be moved to a different location in the process or pipeline (e.g., before the feature engineering step). Similarly, more than one step in the process or pipeline may be validated. In such a case, the importance for performing validation on "similar" data may be increased. The validation step may receive production data (e.g., real-world data collected from real-world interactions), and may modify such production data by modifying or adding one or more data points (e.g., data points that may satisfy a business objective, such as adding specific outlier/inlier points). In this way, the pipeline or processes maintains real-world artifacts and idiosyncrasies in the data before scoring or inference. In some examples, after scoring or inference, the model output may then be used to assess model efficacy or other characteristics of the model against the data that was injected in the validation step. Such an approach may be characterized as an "inline" approach, since the validation is done inline with a production system in place (e.g., instead of in a pre-production step of measuring model efficacy).

Though the figure only shows a single validation step, the validation may be performed continuously. For example, as shown in FIG. 3, an output or result of the model output may then be fed back to the validation step, and the ML may be validated again based on the model output. In this way, a system may continue to refine the ML model inline in the production pipeline or process.

Figure 4:
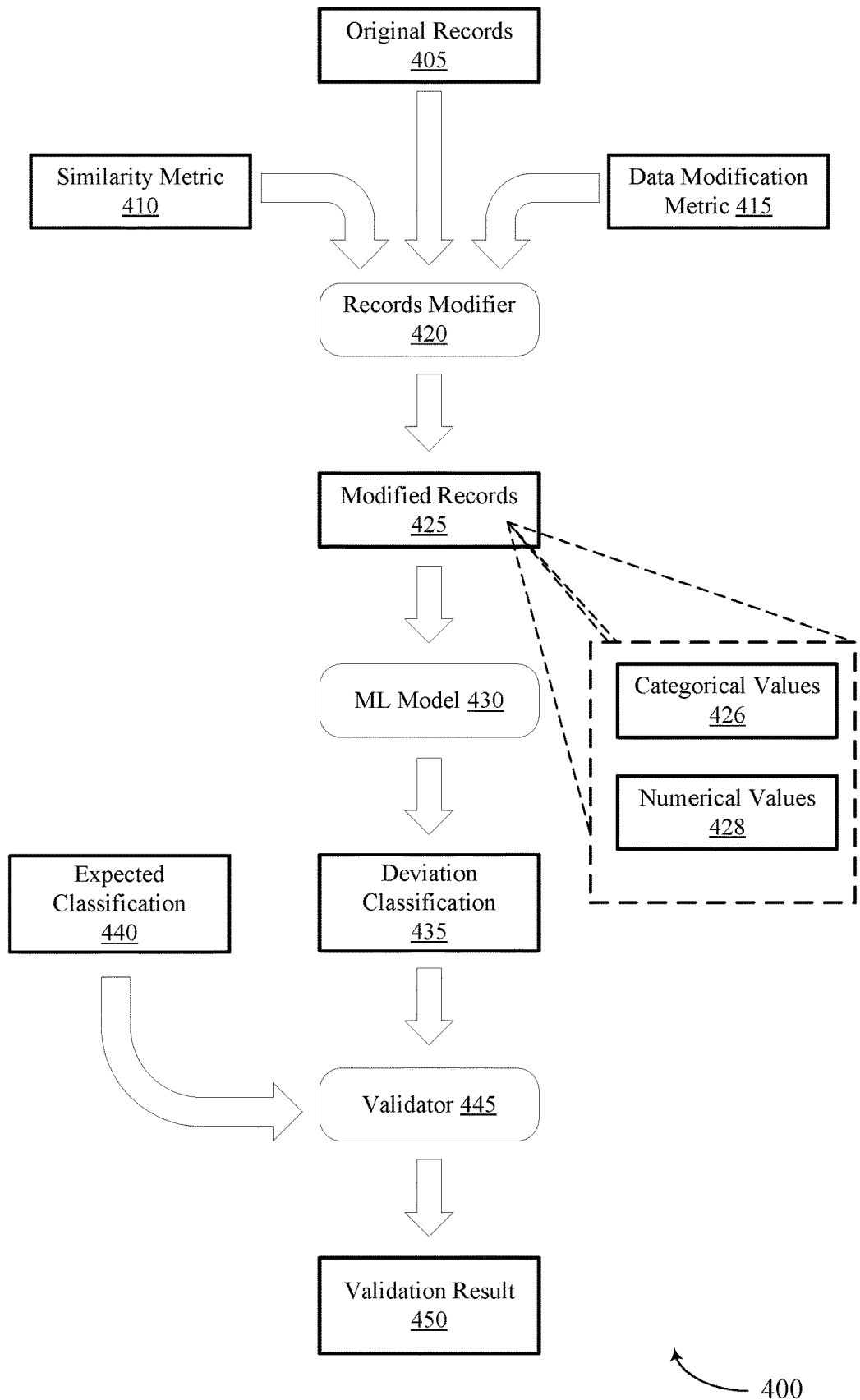
FIG. 4 illustrates an example of a validation scheme that supports inline validation of machine learning models in accordance with aspects of the present disclosure.

FIG. 4 illustrates an example of a validation scheme 400 that supports inline validation of machine learning models in accordance with aspects of the present disclosure. In the validation scheme 400, original records 405 (e.g., records including or associated with interactions of user devices with a computer system, such as one or more production records or datasets) may be modified, and may be modified according to or based on one or more similarity metrics 410, one or more data modification metrics 415, or any combination thereof.

The similarity metric 410 may define permissible deviations or changes to the original records 405 (e.g., to meet the aim of maintaining the real-world idiosyncrasies or characteristics of the data). Such limitations, guidelines, rules, or procedures may be desirable, since scoring or inferencing processes should be done on similar data. Otherwise, scoring or inferencing and measuring efficacy to validate a machine learning model on non-similar data may not provide an accurate representation of the actual performance or validity of a machine learning model.

The data modification metric 415 may define the actual changes or deviations made to the original records 405, and may satisfy the similarity metric 410. Thus, the data modification metric 415 may meet the aim of modifying the data for effective validation, while, at the same time, meeting the aim of similarity and real-world characteristics of the modified records 425. In some examples, the modification of the original records 405 to produce the modified records 425 may be performed by a records modifier 420, in accordance with the approaches described herein.

In some examples, the original records 405, the modified records 425, or both may contain various types of data (e.g., categorical data, numerical data, or other data). Such data may be stored as categorical values 426 and numerical values 428. As a result, in some examples, a server or other computer system implementing the approaches described herein may define, select, or use a similarity metric 410 and a data modification metric 415 for multiple types of data. For examples, such a server may use a first similarity metric 410 and a first data modification metric 415 in connection with categorical data, and the server may further use a second similarity metric 410 and a second data modification metric 415 in connection with numerical data. As described herein, "categorical values" may be examples of data that are represented by a category, type, or text rather than a numerical value. For example, if the real-world data is related to an individual logging into a website, the record related to IP address location may be categorical (e.g., a city, country, region). As described here "numerical values" may be examples of data that are represented by a number (e.g., an integer, a percentage, a range, a time, a date, etc.). Continuing with the example of real-world data related to an individual logging into a website, the record related to the number of login attempts may be an example of a numerical value.

In some examples, a similarity metric 410 for categorical data may be based on a ratio between a probability measure associated with a first statistical function applied to the received original records 405 and a probability measure associated with a second statistical function applied to the modified records 425. For example, such a similarity metric 410 may be defined as:

$$\ln\left[\frac{Prob[F(D_1) \in S]}{Prob[F(D_2) \in S]}\right] = \epsilon$$

where $D_1$ stands for production data (e.g., the original records 405), and $D_2$ stands for the modified data (e.g., the modified records 425). The function "F( )" may be any function that takes in the data as input and outputs a value in range S (e.g., mean, median, mode, another function, or any combination thereof). The result of $\epsilon$ may be a small quantity. In some cases (e.g., for values close to 0), the equation may reduce to 1. This or other similarity metrics 410 or similarity measures may embed statistical similarity.

Similarly, a data modification metric 415 for categorical data may be used. Such a data modification metric 415 may be based on an exponential mechanism, and such an exponential mechanism may be based on a result of the similarity metric 410. In some examples, the data modification metric may satisfy the similarity metric 410. In some examples, such a data modification metric 415 may be defined as:

$$r \propto \exp\frac{\epsilon * Q(x, r)}{2\Delta}.$$

In some examples, $\epsilon$ may represent a result of the similarity metric 410 (e.g., as discussed herein), the function $Q(x,r)$ may be one or more functions that may calculate a frequency or count of attributes. For example, the x value may represent a category of a feature, and the r value may represent an attribute of a feature. The r value may be a value that may be selected or determined based on the $\epsilon$ calculation (e.g., the calculation discussed herein in relation to the similarity metric 410 for categorical data). The $\Delta$ value may be a standard value (e.g., 1). In some examples, the $\Delta$ value may be the Lipschitz constant. In some examples, the $\epsilon$ value may be a value between 0 and 1.

In some examples, a process for adding or modifying data including categorical values may include various steps or operations (e.g., which may align with the data modification metric 415 definition presented above). In some examples, a system or a user may select a subset of categorical features of interest. For each categorical feature, a system may calculate frequencies or counts of attributes. Such a count may include the function $Q(x,r)$. The system may calculate the above probability and pick r based on that probability. In some examples, $\Delta$ may be a standard value such as 1, the Lipschitz constant, or another value. The system or the user may select the $\epsilon$ value to be a value between 0-1. Values close to 0 may modify the original records 405 in a manner closer to picking values uniformly at random. After selecting a value for r, the system or the user may assign the r value for that feature. Such a process may be repeated for other features as selected in the initial set of features. In some examples, such rows of additional data may be added to the original records 405, and the ML model process may continue (e.g., to a scoring or inference step).

In some examples, a similarity metric 410 for numerical data may be used. For example, a similarity metric 410 may be based on a Kullback-Leibler divergence to measure similarity. For example, such a Kullback-Leibler divergence may be defined as:

$$Dist_{KL}(D_2\|D_1) = \Sigma D_2(x) \log \frac{D_2(x)}{D_1(x)}.$$

In such a formulation, $D_1$ may represent production data (the original records 405), where $D_1 = (X_1, X_2, \ldots X_N)$, and $D_2$ may represent the data after modification (e.g., the modified records 425). In some examples, such a formulation may measure the information gain of using $D_2$ instead of $D_1$. As such, if the original records 405 and the modified records 425 are similar, then the gain should be small.

In some examples, a data modification metric 415 for numerical data may be used. For example, a data modification metric 415 may include or be based on a variational auto-encoder (VAE), that may include observed actual production data $X = (X_1, X_2 \ldots X_N)$. In some examples, a VAE may summarize a joint distribution of independent variables that underpin the data. For example, one formulation may be defined as follows:

$l_i(\theta, \phi) = -\mathbb{E}_{z \sim q_\theta(z|x_i)}[\log \mathscr{P}_\phi(x_i|z))] + \mathbb{KL}(q\_\theta(z|x\_i)\|p(z))$. In such a formulation, $X_i$ may be a d-dimensional feature vector that may include numerical features. In some examples, N instances of the feature vector may be observed in the formulation from production data (e.g., original records 405) to train the VAE. Such an expression may be derived from an attempt to minimize a Kullback-Leibler divergence (e.g., between the $\mathbb{KL}(q\_\theta(z|x\_i)\|p(z))$). In some examples, $q(z/x)$ may be an encoder network that represents the distribution of one or more latent variables underpinning data X. In some examples, a Kullback-Leibler divergence between $q(z/x)$ and $p(z/x)$ (e.g., a true distribution of latent variables given X (e.g., the observed data)) may be minimized. In other words, the VAE may explicitly optimize the divergence thereby maximizing the similarity metric (e.g., the similarity metric 410) that was defined herein for numerical values. Thus, samples obtained via the VAE may have a similar distribution as a distribution of the input data (e.g., the original records 405).

In some examples, a user or system may further use a trained VAE to sample or add "new" data points ($Y_i$) that may have similar characteristics to production data. In some examples, a user or system may directly use $Y_i$ along one or more different dimensions. In some examples, the modified data points ($Y_i$) may be processed through the scoring function. As such, detection of anomalies may become possible, and measurement may be performed to determine whether such points may be detected as anomalies.

In some examples, after the modified records 425 are formed (e.g., by one or more of the approaches described herein), the modified records 425 may be run through the ML model 430 itself. The ML model 430 may produce a deviation classification 435. The deviation classification 435 may include or indicate one or more anomalies, events, data points, or other information of interest (e.g., based on the parameters of the ML model 430). A validator 445 may compare the deviation classification 435 with an expected classification 440. The expected classification 440 defines or indicates what an expected output of the ML model 430 would be. Such an expected classification 440 may be based on or associated with the modified records 425, the one or more similarity metrics 410, the one or more data modification metrics 415, one or more business objectives, or any combination thereof. The validator 445 may produce a validation result 450, that may indicate one or more characteristics, data points, similarities, differences, other information, or any combination thereof pertaining to the comparison of the deviation classification 435 and the expected classification 440. For example, if the modified records 425 were modified in a way that should have triggered the ML model 430 to classify the data as anomalous, but the actual deviation classification 435 did not indicate an anomalous result, then the validator 445 may indicate in the validation result 450 that the ML model 430 did not behave as expected. In this way, an expectation may be compared with an actual result, and the ML model 430 may be effectively validated.

Figure 5:
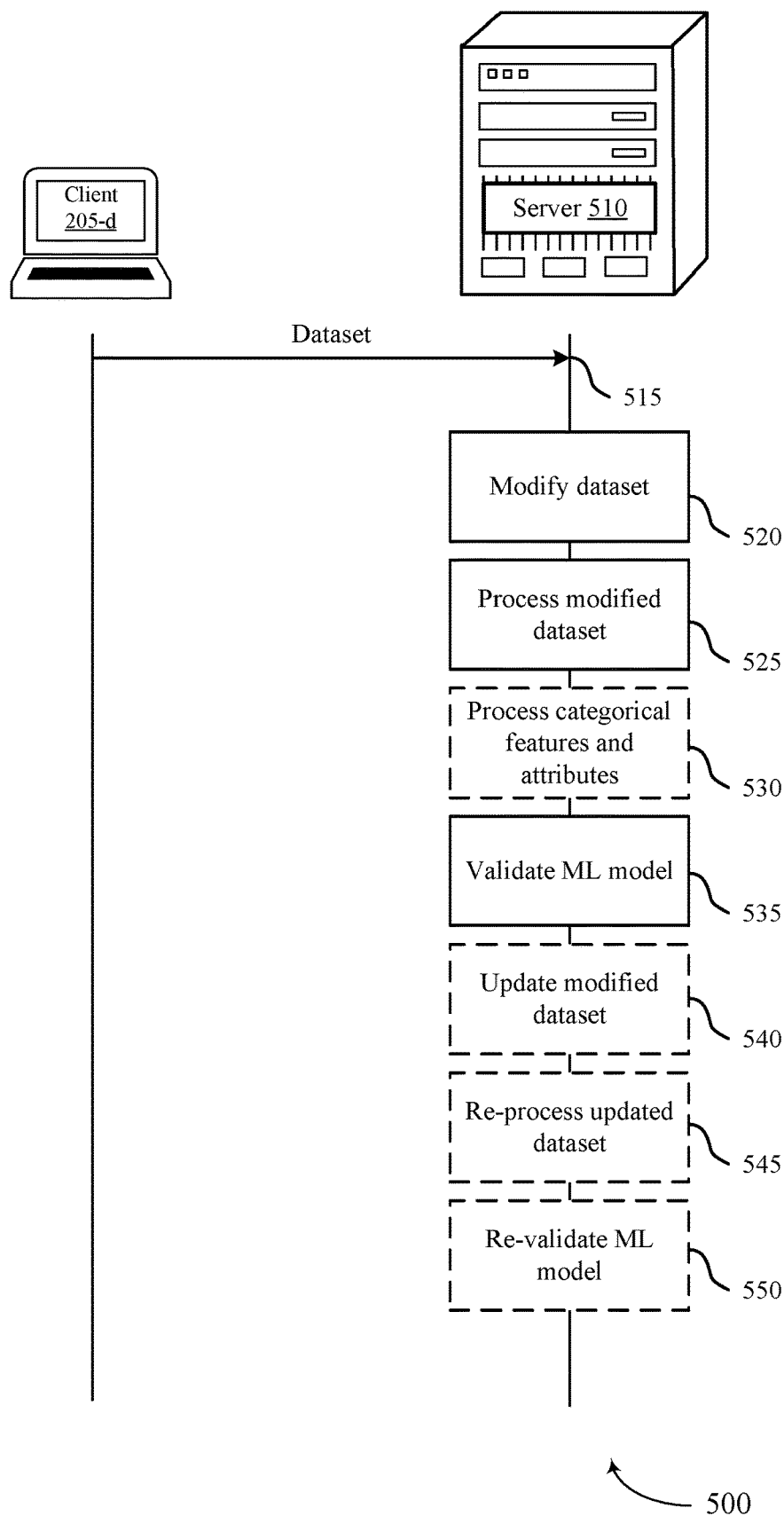
FIG. 5 illustrates an example of a process flow that supports inline validation of machine learning models in accordance with aspects of the present disclosure.

FIG. 5 illustrates an example of a process flow 500 that supports inline validation of machine learning models in accordance with aspects of the present disclosure. The process flow 500 may implement various aspects of the present disclosure described with reference to FIGS. 1-3. The process flow 500 may include a client 205-d and a server 510, which may be examples of the clients 205 and the server 210 as described with reference to FIGS. 1-4.

In the following description of the process flow 500, the operations between the client 205-d and the server 510 may be performed in different orders or at different times. Some operations may also be left out of the process flow 500, or other operations may be added. Although the client 205-*d* and the server 510 are shown performing the operations of the process flow 500, some aspects of some operations may also be performed by one or more other wireless devices.

At 515, the server 510 may receive a dataset comprising a plurality of records associated with one or more interactions of one or more user devices with a computer system. In some examples, the plurality of records may include one or more numerical values, one or more categorical values, or both. The plurality of records may be an example of real-world or production data as described herein.

At 520, the server 510 may modify one or more records of the plurality of records according to a data modification metric, and the modifying may result in a modified dataset that satisfies a similarity metric defining a permissible deviation between the received dataset and the modified dataset according to a deviation threshold. Further, the data modification metric may both satisfy the similarity metric and define a deviation in the modified dataset that results in an expected classification by the machine learning predictive model to classify the deviation in the modified dataset as an outlier event (e.g., an anomaly or some other expected classification). In some examples, modifying the one or more records of the plurality of records may include modifying one or more categorical values comprised in the one or more records. Further, the similarity metric may be based on a ratio between a probability measure associated with a first statistical function applied to the received dataset and a probability measure associated with a second statistical function applied to the modified dataset. Further, the data modification metric may be based on an exponential mechanism that is based on a result of the similarity metric.

In some examples, modifying the one or more records of the plurality of records may include modifying one or more numerical values included in the one or more records, the similarity metric may be based on a Kullback-Leibler divergence measurement applied to the received dataset and the modified dataset and the data modification metric may be based at least in part on a variational auto-encoder based at least in part on the Kullback-Leibler divergence measurement. In some examples, modifying the one or more numerical values may include creating one or more additional numerical values with the variational auto-encoder and adding the one or more additional numerical values to the one or more records.

At 525, the server 510 may process the modified dataset with the machine learning predictive model to produce a classification of the deviation in the modified dataset.

At 530, the server 510 may select one or more categorical features from a plurality of categorical features associated with the one or more records, determine a frequency of occurrence of one or more category attributes associated with the selected one or more categorical features, calculate a probability indication based at least in part on the exponential mechanism, where the exponential mechanism comprises the determined frequency of occurrence and the calculating results in a selection of one of the one or more category attributes, and assign the selected category attribute to the selected one or more categorical features.

At 535, the server 510 may validate the machine learning predictive model by comparing the expected classification to the classification. In some examples, the deviation in the modified dataset may indicate one or more cybersecurity events, issues, indications, information, or any combination thereof.

At 540, the server 510 may update the modified dataset with one or more additional records.

At 545, the server 510 may re-process the modified dataset with the machine learning predictive model to produce a second classification of the deviation in the updated dataset.

At 550, the server 510 may re-validate the machine learning predictive model by comparing the expected classification to the second classification. In some examples, the server 510 may continuously validate the machine learning predictive model.

Figure 6:
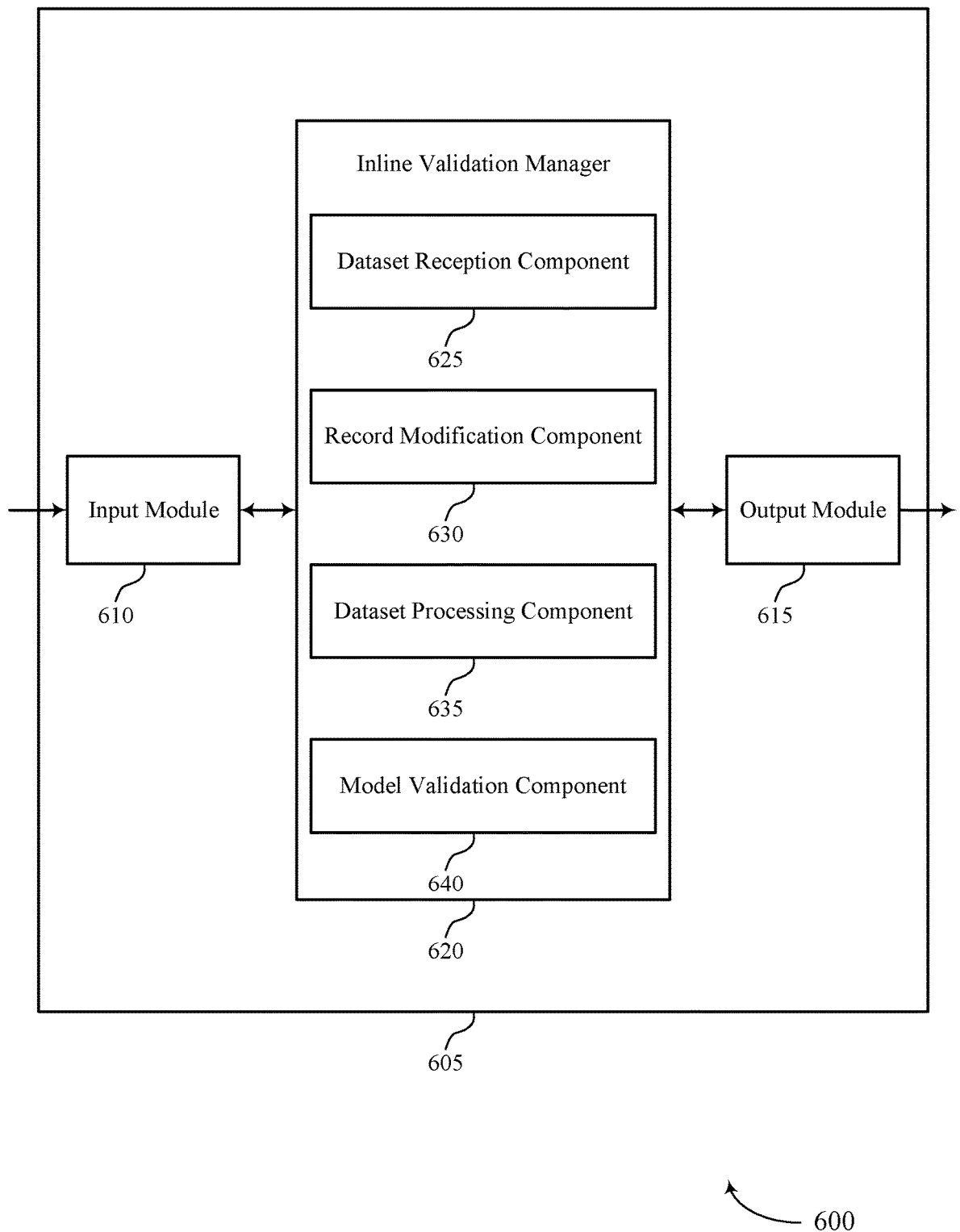
FIG. 6 shows a block diagram of an apparatus that supports inline validation of machine learning models in accordance with aspects of the present disclosure.

FIG. 6 shows a block diagram 600 of a device 605 that supports inline validation of machine learning models in accordance with aspects of the present disclosure. The device 605 may include an input module 610, an output module 615, and an inline validation manager 620. The device 605 may also include a processor. Each of these components may be in communication with one another (e.g., via one or more buses).

The input module 610 may manage input signals for the device 605. For example, the input module 610 may identify input signals based on an interaction with a modem, a keyboard, a mouse, a touchscreen, or a similar device. These input signals may be associated with user input or processing at other components or devices. In some cases, the input module 610 may utilize an operating system such as iOS®, ANDROID®, MS-DOS®, MS-WINDOWS®, OS/2®, UNIX®, LINUX®, or another known operating system to handle input signals. The input module 610 may send aspects of these input signals to other components of the device 605 for processing. For example, the input module 610 may transmit input signals to the inline validation manager 620 to support inline validation of machine learning models. In some cases, the input module 610 may be a component of an I/O controller 810 as described with reference to FIG. 8.

The output module 615 may manage output signals for the device 605. For example, the output module 615 may receive signals from other components of the device 605, such as the inline validation manager 620, and may transmit these signals to other components or devices. In some examples, the output module 615 may transmit output signals for display in a user interface, for storage in a database or data store, for further processing at a server or server cluster, or for any other processes at any number of devices or systems. In some cases, the output module 615 may be a component of an I/O controller 810 as described with reference to FIG. 8.

For example, the inline validation manager 620 may include a dataset reception component 625, a record modification component 630, a dataset processing component 635, a model validation component 640, or any combination thereof. In some examples, the inline validation manager 620, or various components thereof, may be configured to perform various operations (e.g., receiving, monitoring, transmitting) using or otherwise in cooperation with the input module 610, the output module 615, or both. For example, the inline validation manager 620 may receive information from the input module 610, send information to the output module 615, or be integrated in combination with the input module 610, the output module 615, or both to receive information, transmit information, or perform various other operations as described herein.

The inline validation manager 620 may support validating a machine learning predictive model for classifying outlier events in accordance with examples as disclosed herein. The dataset reception component 625 may be configured as or otherwise support a means for receiving a dataset comprising a plurality of records associated with one or more interactions of one or more user devices with a computer system. The record modification component 630 may be configured as or otherwise support a means for modifying one or more records of the plurality of records according to a data modification metric, wherein the modifying results in a modified dataset that satisfies a similarity metric defining a permissible deviation between the received dataset and the modified dataset according to a deviation threshold, and wherein the data modification metric both satisfies the similarity metric and defines a deviation in the modified dataset that results in an expected classification by the machine learning predictive model to classify the deviation in the modified dataset as an outlier event. The dataset processing component 635 may be configured as or otherwise support a means for processing the modified dataset with the machine learning predictive model to produce a classification of the deviation in the modified dataset. The model validation component 640 may be configured as or otherwise support a means for validating the machine learning predictive model by comparing the expected classification to the classification.

Figure 7:
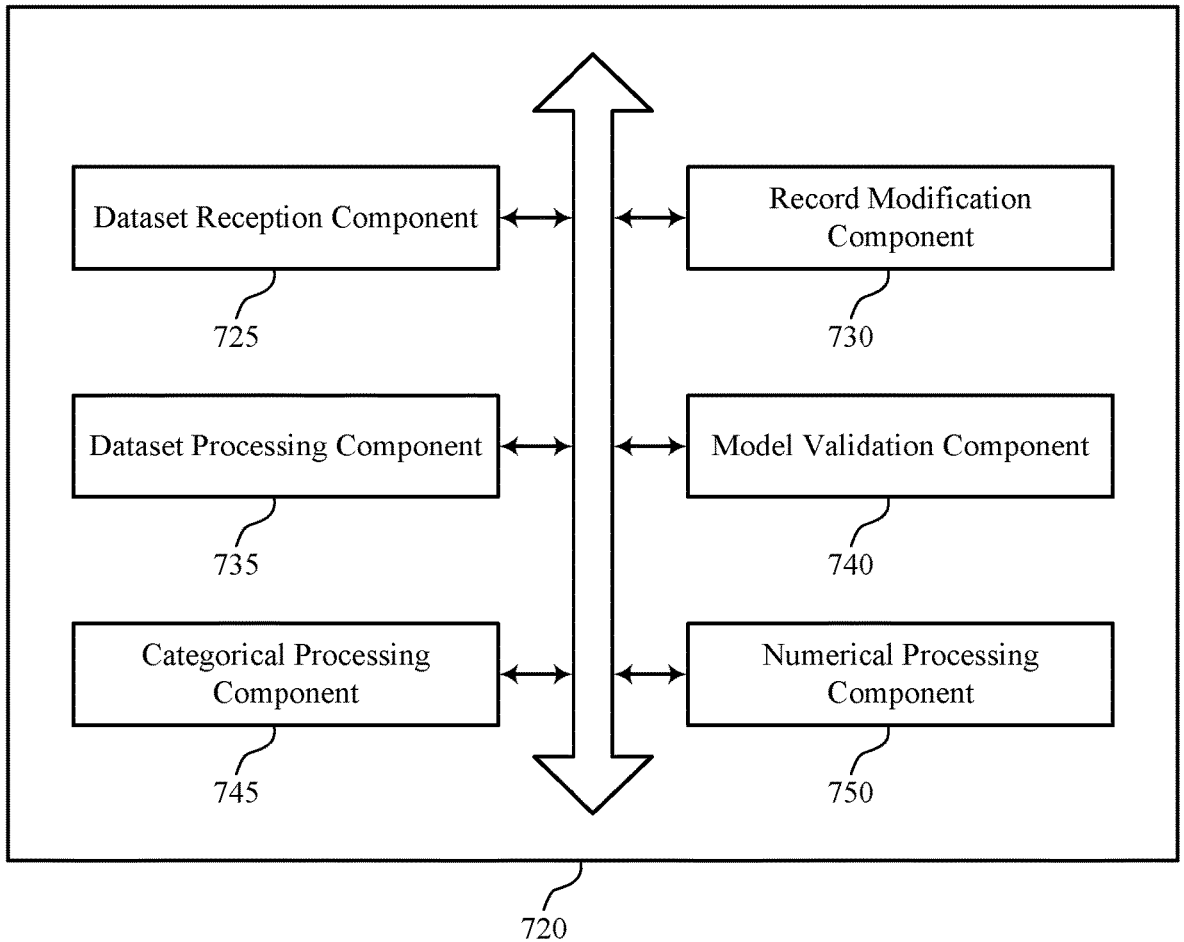
FIG. 7 shows a block diagram of an inline validation manager that supports inline validation of machine learning models in accordance with aspects of the present disclosure.

FIG. 7 shows a block diagram 700 of an inline validation manager 720 that supports inline validation of machine learning models in accordance with aspects of the present disclosure. The inline validation manager 720 may be an example of aspects of an inline validation manager or an inline validation manager 620, or both, as described herein. The inline validation manager 720, or various components thereof, may be an example of means for performing various aspects of inline validation of machine learning models as described herein. For example, the inline validation manager 720 may include a dataset reception component 725, a record modification component 730, a dataset processing component 735, a model validation component 740, a categorical processing component 745, a numerical processing component 750, or any combination thereof. Each of these components may communicate, directly or indirectly, with one another (e.g., via one or more buses).

The inline validation manager 720 may support validating a machine learning predictive model for classifying outlier events in accordance with examples as disclosed herein. The dataset reception component 725 may be configured as or otherwise support a means for receiving a dataset comprising a plurality of records associated with one or more interactions of one or more user devices with a computer system. The record modification component 730 may be configured as or otherwise support a means for modifying one or more records of the plurality of records according to a data modification metric, wherein the modifying results in a modified dataset that satisfies a similarity metric defining a permissible deviation between the received dataset and the modified dataset according to a deviation threshold, and wherein the data modification metric both satisfies the similarity metric and defines a deviation in the modified dataset that results in an expected classification by the machine learning predictive model to classify the deviation in the modified dataset as an outlier event. The dataset processing component 735 may be configured as or otherwise support a means for processing the modified dataset with the machine learning predictive model to produce a classification of the deviation in the modified dataset. The model validation component 740 may be configured as or otherwise support a means for validating the machine learning predictive model by comparing the expected classification to the classification.

In some examples, to support modifying the one or more records of the plurality of records, the categorical processing component 745 may be configured as or otherwise support a means for modifying one or more categorical values comprised in the one or more records. In some examples, the similarity metric is based at least in part on a ratio between a probability measure associated with a first statistical function applied to the received dataset and a probability measure associated with a second statistical function applied to the modified dataset and the data modification metric is based at least in part on an exponential mechanism that is based at least in part on a result of the similarity metric.

In some examples, the categorical processing component 745 may be configured as or otherwise support a means for selecting one or more categorical features from a plurality of categorical features associated with the one or more records. In some examples, the categorical processing component 745 may be configured as or otherwise support a means for determining a frequency of occurrence of one or more category attributes associated with the selected one or more categorical features. In some examples, the categorical processing component 745 may be configured as or otherwise support a means for calculating a probability indication based at least in part on the exponential mechanism, wherein the exponential mechanism comprises the determined frequency of occurrence and the calculating results in a selection of one of the one or more category attributes. In some examples, the categorical processing component 745 may be configured as or otherwise support a means for assigning the selected category attribute to the selected one or more categorical features.

In some examples, to support modifying the one or more records of the plurality of records, the numerical processing component 750 may be configured as or otherwise support a means for modifying one or more numerical values comprised in the one or more records, wherein the similarity metric is based at least in part on a Kullback-Leibler divergence measurement applied to the received dataset and the modified dataset and the data modification metric is based at least in part on a variational auto-encoder based at least in part on the Kullback-Leibler divergence measurement.

In some examples, to support modifying the one or more numerical values, the numerical processing component 750 may be configured as or otherwise support a means for creating one or more additional numerical values with the variational auto-encoder. In some examples, to support modifying the one or more numerical values, the numerical processing component 750 may be configured as or otherwise support a means for adding the one or more additional numerical values to the one or more records.

In some examples, the dataset reception component 725 may be configured as or otherwise support a means for updating the modified dataset with one or more additional records. In some examples, the dataset processing component 735 may be configured as or otherwise support a means for re-processing the modified dataset with the machine learning predictive model to produce a second classification of the deviation in the updated dataset. In some examples, the model validation component 740 may be configured as or otherwise support a means for re-validating the machine learning predictive model by comparing the expected classification to the second classification.

In some examples, the model validation component 740 may be configured as or otherwise support a means for continuously validating the machine learning predictive model.

In some examples, the deviation in the modified dataset indicates one or more cybersecurity events, issues, indications, information, or any combination thereof.

In some examples, the plurality of records comprises one or more numerical values, one or more categorical values, or both.

Figure 8:
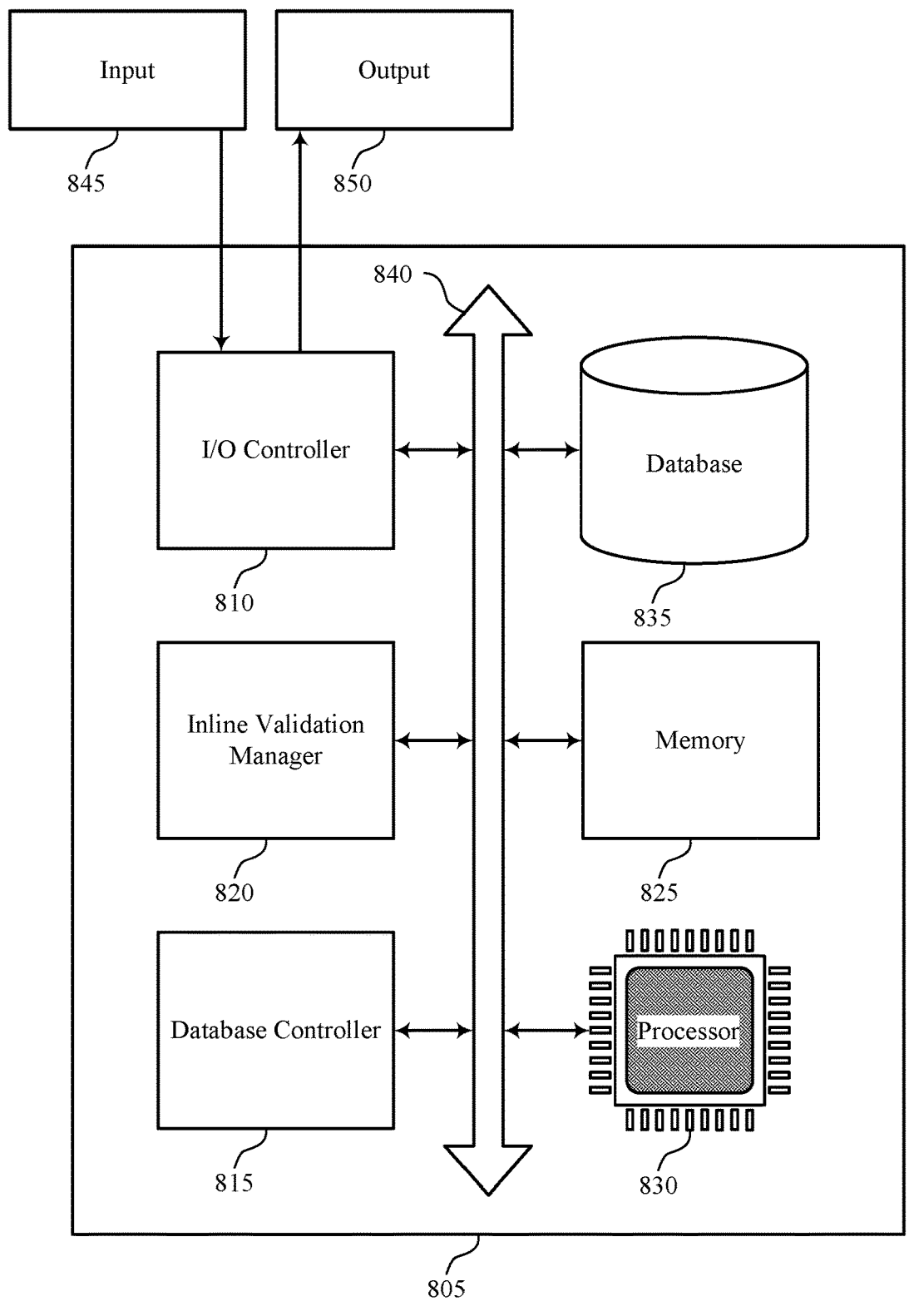
FIG. 8 shows a diagram of a system including a device that supports inline validation of machine learning models in accordance with aspects of the present disclosure.

FIG. 8 shows a diagram of a system 800 including a device 805 that supports inline validation of machine learning models in accordance with aspects of the present disclosure. The device 805 may be an example of or include the components of a device 605 as described herein. The device 805 may include components for bi-directional data communications including components for transmitting and receiving communications, such as an inline validation manager 820, an I/O controller 810, a database controller 815, a memory 825, a processor 830, and a database 835. These components may be in electronic communication or otherwise coupled (e.g., operatively, communicatively, functionally, electronically, electrically) via one or more buses (e.g., a bus 840).

The I/O controller 810 may manage input signals 845 and output signals 850 for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. In other cases, the I/O controller 810 may represent or interact with a modem, a keyboard, a mouse, a touchscreen, or a similar device. In some cases, the I/O controller 810 may be implemented as part of a processor 830. In some examples, a user may interact with the device 805 via the I/O controller 810 or via hardware components controlled by the I/O controller 810.

The database controller 815 may manage data storage and processing in a database 835. In some cases, a user may interact with the database controller 815. In other cases, the database controller 815 may operate automatically without user interaction. The database 835 may be an example of a single database, a distributed database, multiple distributed databases, a data store, a data lake, or an emergency backup database.

Memory 825 may include random-access memory (RAM) and ROM. The memory 825 may store computer-readable, computer-executable software including instructions that, when executed, cause the processor 830 to perform various functions described herein. In some cases, the memory 825 may contain, among other things, a BIOS which may control basic hardware or software operation such as the interaction with peripheral components or devices.

The processor 830 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 830 may be configured to operate a memory array using a memory controller. In other cases, a memory controller may be integrated into the processor 830. The processor 830 may be configured to execute computer-readable instructions stored in a memory 825 to perform various functions (e.g., functions or tasks supporting inline validation of machine learning models).

The inline validation manager 820 may support validating a machine learning predictive model for classifying outlier events in accordance with examples as disclosed herein. For example, the inline validation manager 820 may be configured as or otherwise support a means for receiving a dataset comprising a plurality of records associated with one or more interactions of one or more user devices with a computer system. The inline validation manager 820 may be configured as or otherwise support a means for modifying one or more records of the plurality of records according to a data modification metric, wherein the modifying results in a modified dataset that satisfies a similarity metric defining a permissible deviation between the received dataset and the modified dataset according to a deviation threshold, and wherein the data modification metric both satisfies the similarity metric and defines a deviation in the modified dataset that results in an expected classification by the machine learning predictive model to classify the deviation in the modified dataset as an outlier event. The inline validation manager 820 may be configured as or otherwise support a means for processing the modified dataset with the machine learning predictive model to produce a classification of the deviation in the modified dataset. The inline validation manager 820 may be configured as or otherwise support a means for validating the machine learning predictive model by comparing the expected classification to the classification.

By including or configuring the inline validation manager 820 in accordance with examples as described herein, the device 805 may support techniques for improved real-time or near real-time model validation, reduced latency, improved user experience related to reduced processing, improved utilization of processing capability, or a combination thereof.

Figure 9:
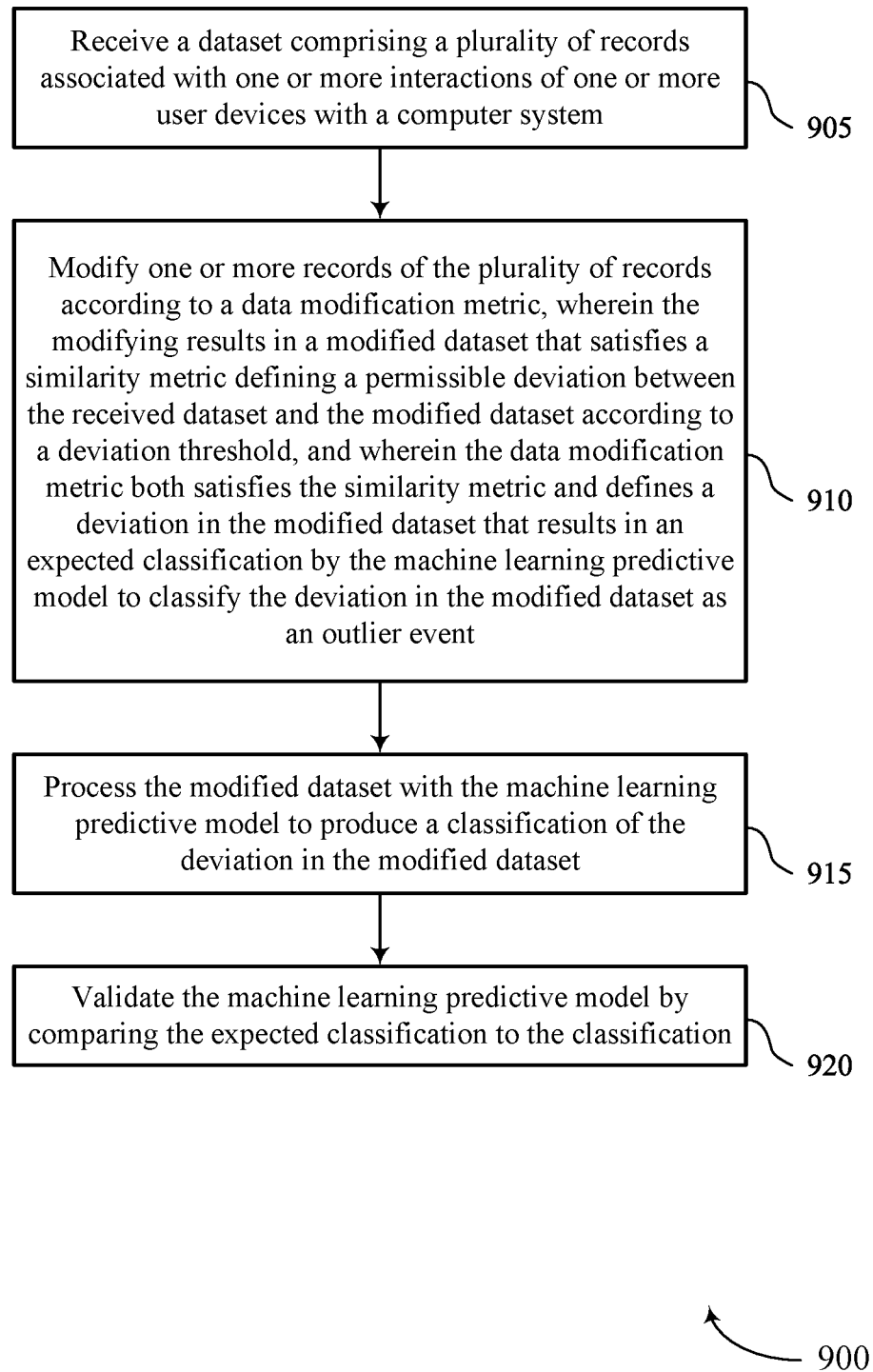
FIGS. 9 through 12 show flowcharts illustrating methods that support inline validation of machine learning models in accordance with aspects of the present disclosure.

FIG. 9 shows a flowchart illustrating a method 900 that supports inline validation of machine learning models in accordance with aspects of the present disclosure. The operations of the method 900 may be implemented by an application server or its components as described herein. For example, the operations of the method 900 may be performed by an application server as described with reference to FIGS. 1 through 8. In some examples, an application server may execute a set of instructions to control the functional elements of the application server to perform the described functions. Additionally or alternatively, the application server may perform aspects of the described functions using special-purpose hardware.

At 905, the method may include receiving a dataset comprising a plurality of records associated with one or more interactions of one or more user devices with a computer system. The operations of 905 may be performed in accordance with examples as disclosed herein. In some examples, aspects of the operations of 905 may be performed by a dataset reception component 725 as described with reference to FIG. 7.

At 910, the method may include modifying one or more records of the plurality of records according to a data modification metric, wherein the modifying results in a modified dataset that satisfies a similarity metric defining a permissible deviation between the received dataset and the modified dataset according to a deviation threshold, and wherein the data modification metric both satisfies the similarity metric and defines a deviation in the modified dataset that results in an expected classification by the machine learning predictive model to classify the deviation in the modified dataset as an outlier event. The operations of 910 may be performed in accordance with examples as disclosed herein. In some examples, aspects of the operations of 910 may be performed by a record modification component 730 as described with reference to FIG. 7.

At 915, the method may include processing the modified dataset with the machine learning predictive model to produce a classification of the deviation in the modified dataset. The operations of 915 may be performed in accordance with examples as disclosed herein. In some examples, aspects of the operations of 915 may be performed by a dataset processing component 735 as described with reference to FIG. 7.

At 920, the method may include validating the machine learning predictive model by comparing the expected classification to the classification. The operations of 920 may be performed in accordance with examples as disclosed herein. In some examples, aspects of the operations of 920 may be performed by a model validation component 740 as described with reference to FIG. 7.

Figure 10:
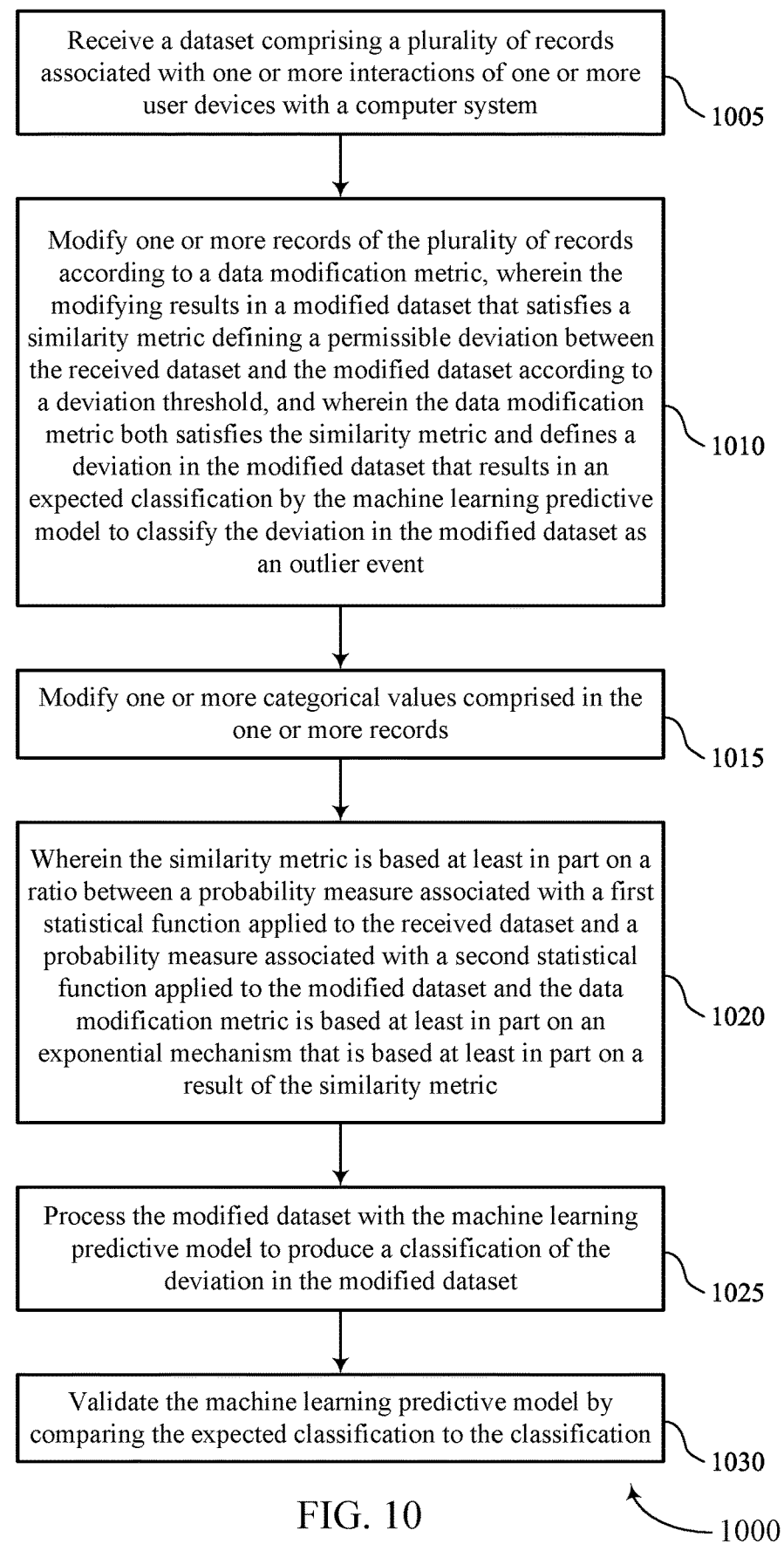

FIG. 10 shows a flowchart illustrating a method 1000 that supports inline validation of machine learning models in accordance with aspects of the present disclosure. The operations of the method 1000 may be implemented by an application server or its components as described herein. For example, the operations of the method 1000 may be performed by an application server as described with reference to FIGS. 1 through 8. In some examples, an application server may execute a set of instructions to control the functional elements of the application server to perform the described functions. Additionally or alternatively, the application server may perform aspects of the described functions using special-purpose hardware.

At 1005, the method may include receiving a dataset comprising a plurality of records associated with one or more interactions of one or more user devices with a computer system. The operations of 1005 may be performed in accordance with examples as disclosed herein. In some examples, aspects of the operations of 1005 may be performed by a dataset reception component 725 as described with reference to FIG. 7.

At 1010, the method may include modifying one or more records of the plurality of records according to a data modification metric, wherein the modifying results in a modified dataset that satisfies a similarity metric defining a permissible deviation between the received dataset and the modified dataset according to a deviation threshold, and wherein the data modification metric both satisfies the similarity metric and defines a deviation in the modified dataset that results in an expected classification by the machine learning predictive model to classify the deviation in the modified dataset as an outlier event. The operations of 1010 may be performed in accordance with examples as disclosed herein. In some examples, aspects of the operations of 1010 may be performed by a record modification component 730 as described with reference to FIG. 7.

At 1015, the method may include modifying one or more categorical values comprised in the one or more records. The operations of 1015 may be performed in accordance with examples as disclosed herein. In some examples, aspects of the operations of 1015 may be performed by a categorical processing component 745 as described with reference to FIG. 7.

At 1020, in the described method, the similarity metric may be based at least in part on a ratio between a probability measure associated with a first statistical function applied to the received dataset and a probability measure associated with a second statistical function applied to the modified dataset, and the data modification metric may be based at least in part on an exponential mechanism that is based at least in part on a result of the similarity metric. The operations of 1020 may be performed in accordance with examples as disclosed herein. In some examples, aspects of the operations of 1020 may be performed by a categorical processing component 745 as described with reference to FIG. 7.

At 1025, the method may include processing the modified dataset with the machine learning predictive model to produce a classification of the deviation in the modified dataset. The operations of 1025 may be performed in accordance with examples as disclosed herein. In some examples, aspects of the operations of 1025 may be performed by a dataset processing component 735 as described with reference to FIG. 7.

At 1030, the method may include validating the machine learning predictive model by comparing the expected classification to the classification. The operations of 1030 may be performed in accordance with examples as disclosed herein. In some examples, aspects of the operations of 1030 may be performed by a model validation component 740 as described with reference to FIG. 7.

Figure 11:
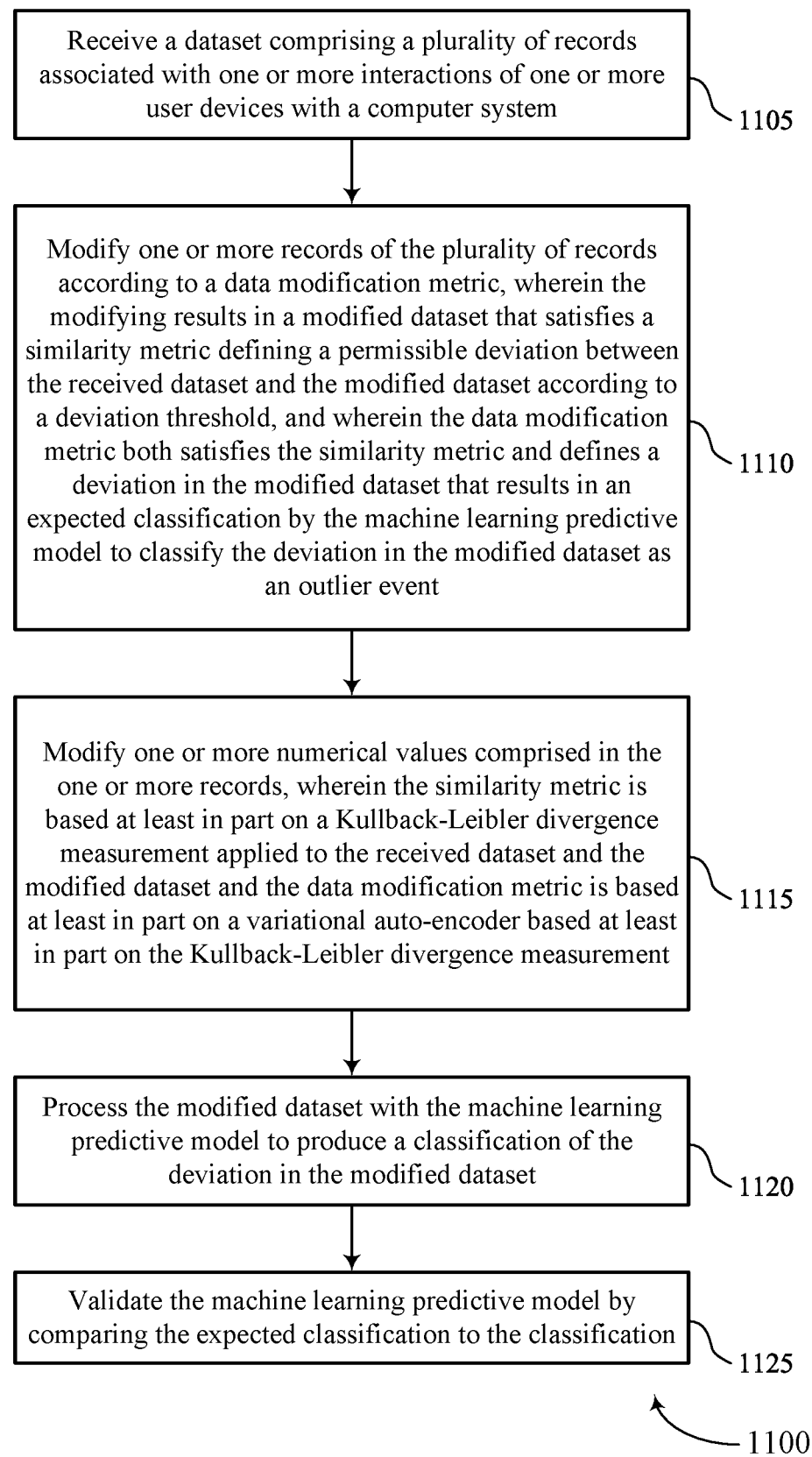

FIG. 11 shows a flowchart illustrating a method 1100 that supports inline validation of machine learning models in accordance with aspects of the present disclosure. The operations of the method 1100 may be implemented by an application server or its components as described herein. For example, the operations of the method 1100 may be performed by an application server as described with reference to FIGS. 1 through 8. In some examples, an application server may execute a set of instructions to control the functional elements of the application server to perform the described functions. Additionally or alternatively, the application server may perform aspects of the described functions using special-purpose hardware.

At 1105, the method may include receiving a dataset comprising a plurality of records associated with one or more interactions of one or more user devices with a computer system. The operations of 1105 may be performed in accordance with examples as disclosed herein. In some examples, aspects of the operations of 1105 may be performed by a dataset reception component 725 as described with reference to FIG. 7.

At 1110, the method may include modifying one or more records of the plurality of records according to a data modification metric, wherein the modifying results in a modified dataset that satisfies a similarity metric defining a permissible deviation between the received dataset and the modified dataset according to a deviation threshold, and wherein the data modification metric both satisfies the similarity metric and defines a deviation in the modified dataset that results in an expected classification by the machine learning predictive model to classify the deviation in the modified dataset as an outlier event. The operations of 1110 may be performed in accordance with examples as disclosed herein. In some examples, aspects of the operations of 1110 may be performed by a record modification component 730 as described with reference to FIG. 7.

At 1115, the method may include modifying one or more numerical values comprised in the one or more records, wherein the similarity metric is based at least in part on a Kullback-Leibler divergence measurement applied to the received dataset and the modified dataset and the data modification metric is based at least in part on a variational auto-encoder based at least in part on the Kullback-Leibler divergence measurement. The operations of 1115 may be performed in accordance with examples as disclosed herein. In some examples, aspects of the operations of 1115 may be performed by a numerical processing component 750 as described with reference to FIG. 7.

At 1120, the method may include processing the modified dataset with the machine learning predictive model to produce a classification of the deviation in the modified dataset. The operations of 1120 may be performed in accordance with examples as disclosed herein. In some examples, aspects of the operations of 1120 may be performed by a dataset processing component 735 as described with reference to FIG. 7.

At 1125, the method may include validating the machine learning predictive model by comparing the expected classification to the classification. The operations of 1125 may be performed in accordance with examples as disclosed herein. In some examples, aspects of the operations of 1125 may be performed by a model validation component 740 as described with reference to FIG. 7.

Figure 12:
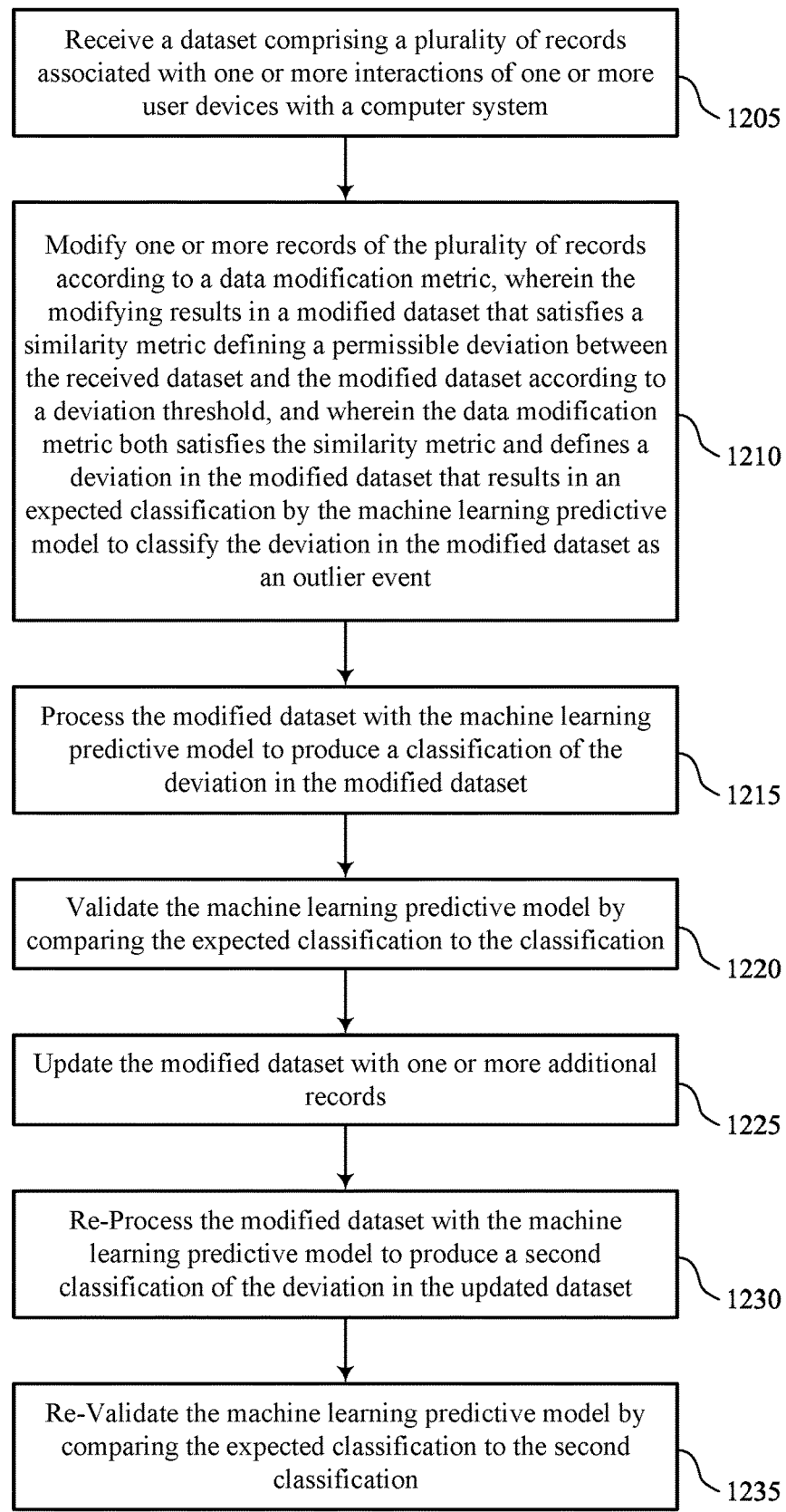

FIG. 12 shows a flowchart illustrating a method 1200 that supports inline validation of machine learning models in accordance with aspects of the present disclosure. The operations of the method 1200 may be implemented by an application server or its components as described herein. For example, the operations of the method 1200 may be performed by an application server as described with reference to FIGS. 1 through 8. In some examples, an application server may execute a set of instructions to control the functional elements of the application server to perform the described functions. Additionally or alternatively, the application server may perform aspects of the described functions using special-purpose hardware.

At 1205, the method may include receiving a dataset comprising a plurality of records associated with one or more interactions of one or more user devices with a computer system. The operations of 1205 may be performed in accordance with examples as disclosed herein. In some examples, aspects of the operations of 1205 may be performed by a dataset reception component 725 as described with reference to FIG. 7.

At 1210, the method may include modifying one or more records of the plurality of records according to a data modification metric, wherein the modifying results in a modified dataset that satisfies a similarity metric defining a permissible deviation between the received dataset and the modified dataset according to a deviation threshold, and wherein the data modification metric both satisfies the similarity metric and defines a deviation in the modified dataset that results in an expected classification by the machine learning predictive model to classify the deviation in the modified dataset as an outlier event. The operations of 1210 may be performed in accordance with examples as disclosed herein. In some examples, aspects of the operations of 1210 may be performed by a record modification component 730 as described with reference to FIG. 7.

At 1215, the method may include processing the modified dataset with the machine learning predictive model to produce a classification of the deviation in the modified dataset. The operations of 1215 may be performed in accordance with examples as disclosed herein. In some examples, aspects of the operations of 1215 may be performed by a dataset processing component 735 as described with reference to FIG. 7.

At 1220, the method may include validating the machine learning predictive model by comparing the expected classification to the classification. The operations of 1220 may be performed in accordance with examples as disclosed herein. In some examples, aspects of the operations of 1220 may be performed by a model validation component 740 as described with reference to FIG. 7.

At 1225, the method may include updating the modified dataset with one or more additional records. The operations of 1225 may be performed in accordance with examples as disclosed herein. In some examples, aspects of the operations of 1225 may be performed by a dataset reception component 725 as described with reference to FIG. 7.

At 1230, the method may include re-processing the modified dataset with the machine learning predictive model to produce a second classification of the deviation in the updated dataset. The operations of 1230 may be performed in accordance with examples as disclosed herein. In some examples, aspects of the operations of 1230 may be performed by a dataset processing component 735 as described with reference to FIG. 7.

At 1235, the method may include re-validating the machine learning predictive model by comparing the expected classification to the second classification. The operations of 1235 may be performed in accordance with examples as disclosed herein. In some examples, aspects of the operations of 1235 may be performed by a model validation component 740 as described with reference to FIG. 7.

A method for validating a machine learning predictive model for classifying outlier events is described. The method may include receiving a dataset comprising a plurality of records associated with one or more interactions of one or more user devices with a computer system, modifying one or more records of the plurality of records according to a data modification metric, wherein the modifying results in a modified dataset that satisfies a similarity metric defining a permissible deviation between the received dataset and the modified dataset according to a deviation threshold, and wherein the data modification metric both satisfies the similarity metric and defines a deviation in the modified dataset that results in an expected classification by the machine learning predictive model to classify the deviation in the modified dataset as an outlier event, processing the modified dataset with the machine learning predictive model to produce a classification of the deviation in the modified dataset, and validating the machine learning predictive model by comparing the expected classification to the classification.

An apparatus for validating a machine learning predictive model for classifying outlier events is described. The apparatus may include a processor, memory coupled with the processor, and instructions stored in the memory. The instructions may be executable by the processor to cause the apparatus to receive a dataset comprising a plurality of records associated with one or more interactions of one or more user devices with a computer system, modify one or more records of the plurality of records according to a data modification metric, wherein the modifying results in a modified dataset that satisfies a similarity metric defining a permissible deviation between the received dataset and the modified dataset according to a deviation threshold, and wherein the data modification metric both satisfies the similarity metric and defines a deviation in the modified dataset that results in an expected classification by the machine learning predictive model to classify the deviation in the modified dataset as an outlier event, process the modified dataset with the machine learning predictive model to produce a classification of the deviation in the modified dataset, and validate the machine learning predictive model by comparing the expected classification to the classification.

Another apparatus for validating a machine learning predictive model for classifying outlier events is described. The apparatus may include means for receiving a dataset comprising a plurality of records associated with one or more interactions of one or more user devices with a computer system, means for modifying one or more records of the plurality of records according to a data modification metric, wherein the modifying results in a modified dataset that satisfies a similarity metric defining a permissible deviation between the received dataset and the modified dataset according to a deviation threshold, and wherein the data modification metric both satisfies the similarity metric and defines a deviation in the modified dataset that results in an expected classification by the machine learning predictive model to classify the deviation in the modified dataset as an outlier event, means for processing the modified dataset with the machine learning predictive model to produce a classification of the deviation in the modified dataset, and means for validating the machine learning predictive model by comparing the expected classification to the classification.

A non-transitory computer-readable medium storing code for validating a machine learning predictive model for classifying outlier events is described. The code may include instructions executable by a processor to receive a dataset comprising a plurality of records associated with one or more interactions of one or more user devices with a computer system, modify one or more records of the plurality of records according to a data modification metric, wherein the modifying results in a modified dataset that satisfies a similarity metric defining a permissible deviation between the received dataset and the modified dataset according to a deviation threshold, and wherein the data modification metric both satisfies the similarity metric and defines a deviation in the modified dataset that results in an expected classification by the machine learning predictive model to classify the deviation in the modified dataset as an outlier event, process the modified dataset with the machine learning predictive model to produce a classification of the deviation in the modified dataset, and validate the machine learning predictive model by comparing the expected classification to the classification.

In some examples of the method, apparatuses, and non-transitory computer-readable medium described herein, modifying the one or more records of the plurality of records may include operations, features, means, or instructions for modifying one or more categorical values comprised in the one or more records and wherein the similarity metric may be based at least in part on a ratio between a probability measure associated with a first statistical function applied to the received dataset and a probability measure associated with a second statistical function applied to the modified dataset, and wherein the data modification metric may be based at least in part on an exponential mechanism that may be based at least in part on a result of the similarity metric.

Some examples of the method, apparatuses, and non-transitory computer-readable medium described herein may further include operations, features, means, or instructions for selecting one or more categorical features from a plurality of categorical features associated with the one or more records, determining a frequency of occurrence of one or more category attributes associated with the selected one or more categorical features, calculating a probability indication based at least in part on the exponential mechanism, wherein the exponential mechanism comprises the determined frequency of occurrence and the calculating results in a selection of one of the one or more category attributes, and assigning the selected category attribute to the selected one or more categorical features.

In some examples of the method, apparatuses, and non-transitory computer-readable medium described herein, modifying the one or more records of the plurality of records may include operations, features, means, or instructions for modifying one or more numerical values comprised in the one or more records, wherein the similarity metric may be based at least in part on a Kullback-Leibler divergence measurement applied to the received dataset and the modified dataset and the data modification metric may be based at least in part on a variational auto-encoder based at least in part on the Kullback-Leibler divergence measurement.

In some examples of the method, apparatuses, and non-transitory computer-readable medium described herein, modifying the one or more numerical values may include operations, features, means, or instructions for creating one or more additional numerical values with the variational auto-encoder and adding the one or more additional numerical values to the one or more records.

Some examples of the method, apparatuses, and non-transitory computer-readable medium described herein may further include operations, features, means, or instructions for updating the modified dataset with one or more additional records, re-processing the modified dataset with the machine learning predictive model to produce a second classification of the deviation in the updated dataset, and re-validating the machine learning predictive model by comparing the expected classification to the second classification.

In some examples of the method, apparatuses, and non-transitory computer-readable medium described herein, continuously validating the machine learning predictive model.

In some examples of the method, apparatuses, and non-transitory computer-readable medium described herein, the deviation in the modified dataset indicates one or more cybersecurity events, issues, indications, information, or any combination thereof.

In some examples of the method, apparatuses, and non-transitory computer-readable medium described herein, the plurality of records comprises one or more numerical values, one or more categorical values, or both.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for validating a machine learning predictive model for classifying outlier events occurring at a computer system as security events, comprising:

receiving a dataset comprising a plurality of records associated with one or more interactions of one or more user devices with the computer system;

modifying one or more records of the plurality of records according to a data modification metric, wherein the modifying results in a modified dataset that satisfies a similarity metric defining a permissible deviation between the received dataset and the modified dataset according to a deviation threshold, and wherein the data modification metric both satisfies the similarity metric and defines a deviation in the modified dataset that results in an expected classification by the machine learning predictive model to classify the deviation in the modified dataset as an outlier event corresponding to one or more inserted security events within the one or more interactions, and wherein the data modification metric is based at least in part on an exponential mechanism that is based at least in part on a ratio between a result of the similarity metric and a Lipschitz constant;

processing the modified dataset with the machine learning predictive model to produce a classification of the deviation in the modified dataset as one or more detected security events within the one or more interactions;

validating the machine learning predictive model by comparing the expected classification corresponding to the one or more inserted security events to the classification corresponding to the one or more detected security events; and analyzing, with the machine learning predictive model, a second dataset to detect one or more anomalies in the second dataset corresponding to authentic security events.

2. The method of claim 1, wherein modifying the one or more records of the plurality of records comprises:

modifying one or more categorical values comprised in the one or more records, wherein the similarity metric is based at least in part on a ratio between a probability measure associated with a first statistical function applied to the received dataset and a probability measure associated with a second statistical function applied to the modified dataset.

3. The method of claim 2, further comprising:
selecting one or more categorical features from a plurality of categorical features associated with the one or more records;
determining a frequency of occurrence of one or more category attributes associated with the selected one or more categorical features;
calculating a probability indication based at least in part on the exponential mechanism, wherein the exponential mechanism comprises the determined frequency of occurrence and the calculating results in a selection of one of the one or more category attributes; and
assigning a selected category attribute to the selected one or more categorical features.

4. The method of claim 1, wherein modifying the one or more records of the plurality of records comprises:
modifying one or more numerical values comprised in the one or more records, wherein the similarity metric is based at least in part on a Kullback-Leibler divergence measurement applied to the received dataset and the modified dataset and the data modification metric is based at least in part on a variational auto-encoder based at least in part on the Kullback-Leibler divergence measurement.

5. The method of claim 4, wherein modifying the one or more numerical values comprises:
creating one or more additional numerical values with the variational auto-encoder; and
adding the one or more additional numerical values to the one or more records.

6. The method of claim 1, further comprising:
updating the modified dataset with one or more additional records;
re-processing the modified dataset with the machine learning predictive model to produce a second classification of the deviation in the updated dataset; and
re-validating the machine learning predictive model by comparing the expected classification to the second classification.

7. The method of claim 1, further comprising:
continuously validating the machine learning predictive model.

8. The method of claim 1, wherein the deviation in the modified dataset indicates one or more cybersecurity events, issues, indications, information, or any combination thereof.

9. The method of claim 1, wherein the plurality of records comprises one or more numerical values, one or more categorical values, or both.

10. An apparatus for validating a machine learning predictive model for classifying outlier events occurring at a computer system as security events, comprising:
a processor;
memory coupled with the processor; and
instructions stored in the memory and executable by the processor to cause the apparatus to:
receive a dataset comprising a plurality of records associated with one or more interactions of one or more user devices with the computer system;
modify one or more records of the plurality of records according to a data modification metric, wherein the modifying results in a modified dataset that satisfies a similarity metric defining a permissible deviation between the received dataset and the modified dataset according to a deviation threshold, and wherein the data modification metric both satisfies the similarity metric and defines a deviation in the modified dataset that results in an expected classification by the machine learning predictive model to classify the deviation in the modified dataset as an outlier event corresponding to one or more inserted security events within the one or more interactions, and wherein the data modification metric is based at least in part on an exponential mechanism that is based at least in part on a ratio between a result of the similarity metric and a Lipschitz constant;
process the modified dataset with the machine learning predictive model to produce a classification of the deviation in the modified dataset as one or more detected security events within the one or more interactions;
validate the machine learning predictive model by comparing the expected classification corresponding to the one or more inserted security events to the classification corresponding to the one or more detected security events; and
analyze, with the machine learning predictive model, a second dataset to detect one or more anomalies in the second dataset corresponding to authentic security events.

11. The apparatus of claim 10, wherein the instructions to modify the one or more records of the plurality of records are executable by the processor to cause the apparatus to:
modify one or more categorical values comprised in the one or more records, wherein the similarity metric is based at least in part on a ratio between a probability measure associated with a first statistical function applied to the received dataset and a probability measure associated with a second statistical function applied to the modified dataset.

12. The apparatus of claim 11, wherein the instructions are further executable by the processor to cause the apparatus to:
select one or more categorical features from a plurality of categorical features associated with the one or more records;
determine a frequency of occurrence of one or more category attributes associated with the selected one or more categorical features;
calculate a probability indication based at least in part on the exponential mechanism, wherein the exponential mechanism comprises the determined frequency of occurrence and the calculating results in a selection of one of the one or more category attributes; and
assign a selected category attribute to the selected one or more categorical features.

13. The apparatus of claim 10, wherein the instructions to modify the one or more records of the plurality of records are executable by the processor to cause the apparatus to:
modify one or more numerical values comprised in the one or more records, wherein the similarity metric is based at least in part on a Kullback-Leibler divergence measurement applied to the received dataset and the modified dataset and the data modification metric is based at least in part on a variational auto-encoder based at least in part on the Kullback-Leibler divergence measurement.

14. The apparatus of claim 13, wherein the instructions to modify the one or more numerical values are executable by the processor to cause the apparatus to:
create one or more additional numerical values with the variational auto-encoder; and
add the one or more additional numerical values to the one or more records.

15. The apparatus of claim 10, wherein the instructions are further executable by the processor to cause the apparatus to:

update the modified dataset with one or more additional records;

re-process the modified dataset with the machine learning predictive model to produce a second classification of the deviation in the updated dataset; and re-validate the machine learning predictive model by comparing the expected classification to the second classification.

16. The apparatus of claim 10, wherein the deviation in the modified dataset indicates one or more cybersecurity events, issues, indications, information, or any combination thereof.

17. The apparatus of claim 10, wherein the plurality of records comprises one or more numerical values, one or more categorical values, or both.

18. A non-transitory computer-readable medium storing code for validating a machine learning predictive model for classifying outlier events occurring at a computer system as security events, the code comprising instructions executable by a processor to:

receive a dataset comprising a plurality of records associated with one or more interactions of one or more user devices with the computer system;

modify one or more records of the plurality of records according to a data modification metric, wherein the modifying results in a modified dataset that satisfies a similarity metric defining a permissible deviation between the received dataset and the modified dataset according to a deviation threshold, and wherein the data modification metric both satisfies the similarity metric and defines a deviation in the modified dataset that results in an expected classification by the machine learning predictive model to classify the deviation in the modified dataset as an outlier event corresponding to one or more inserted security events within the one or more interactions, and wherein the data modification metric is based at least in part on an exponential mechanism that is based at least in part on a ratio between a result of the similarity metric and a Lipschitz constant;

process the modified dataset with the machine learning predictive model to produce a classification of the deviation in the modified dataset as one or more detected security events within the one or more interactions;

validate the machine learning predictive model by comparing the expected classification corresponding to the one or more inserted security events to the classification corresponding to the one or more detected security events; and analyze, with the machine learning predictive model, a second dataset to detect one or more anomalies in the second dataset corresponding to authentic security events.

19. The non-transitory computer-readable medium of claim 18, wherein the instructions to modify the one or more records of the plurality of records are executable by the processor to:

modify one or more categorical values comprised in the one or more records, wherein the similarity metric is based at least in part on a ratio between a probability measure associated with a first statistical function applied to the received dataset and a probability measure associated with a second statistical function applied to the modified dataset.

20. The non-transitory computer-readable medium of claim 18, wherein the instructions to modify the one or more records of the plurality of records are executable by the processor to:

modify one or more numerical values comprised in the one or more records, wherein the similarity metric is based at least in part on a Kullback-Leibler divergence measurement applied to the received dataset and the modified dataset and the data modification metric is based at least in part on a variational auto-encoder based at least in part on the Kullback-Leibler divergence measurement.

\* \* \* \* \*